Sept. 27, 1938.   O. H. BASQUIN ET AL   2,131,683
WEIGHING APPARATUS
Filed March 16, 1936   10 Sheets-Sheet 1
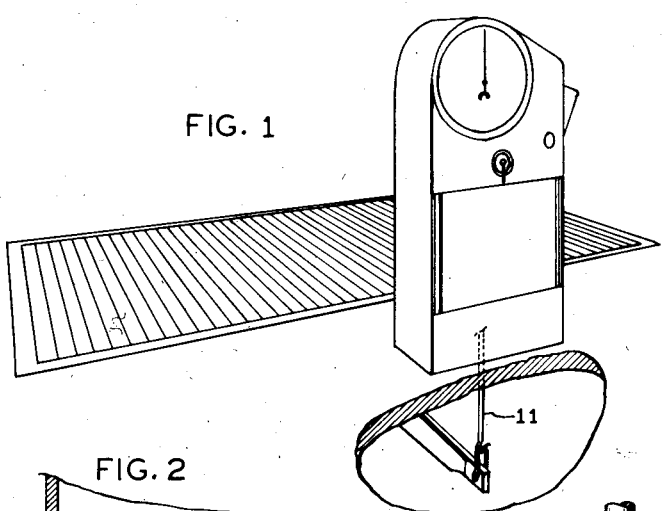
FIG. 1
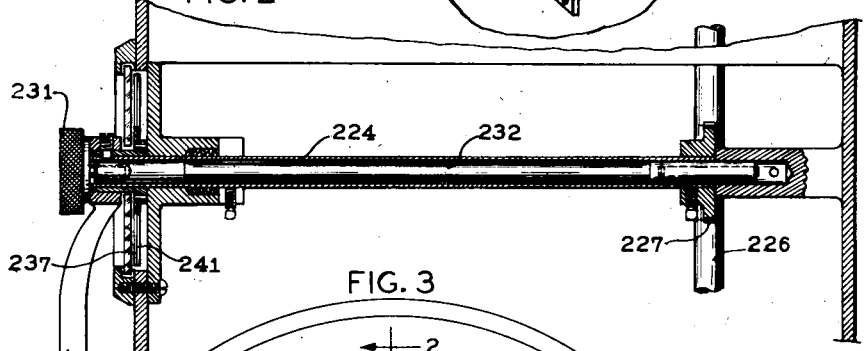
FIG. 2
FIG. 3
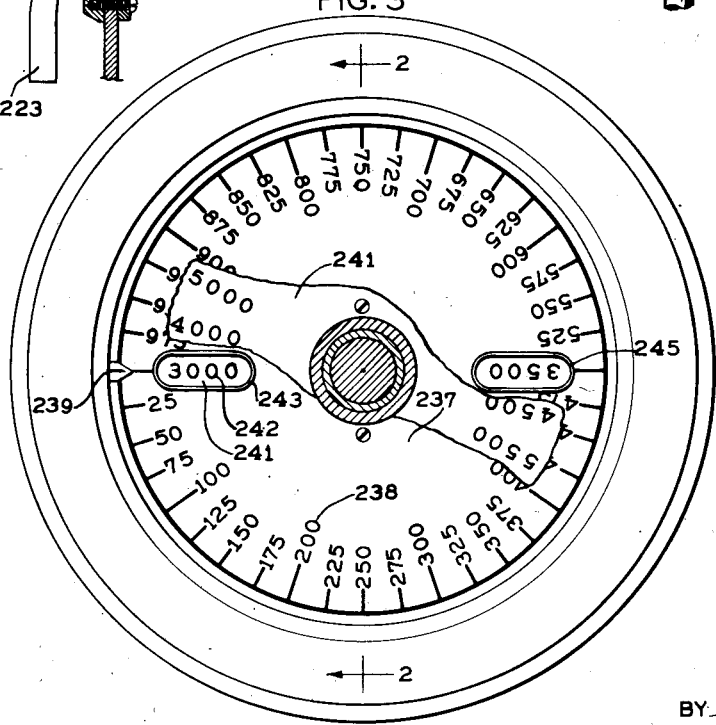
INVENTORS
OLIN H. BASQUIN
OTTO P. HAEGELE
BY Roland C. Behm
ATTORNEY Sept. 27, 1938.　　O. H. BASQUIN ET AL　　2,131,683
WEIGHING APPARATUS
Filed March 16, 1936　　10 Sheets-Sheet 2
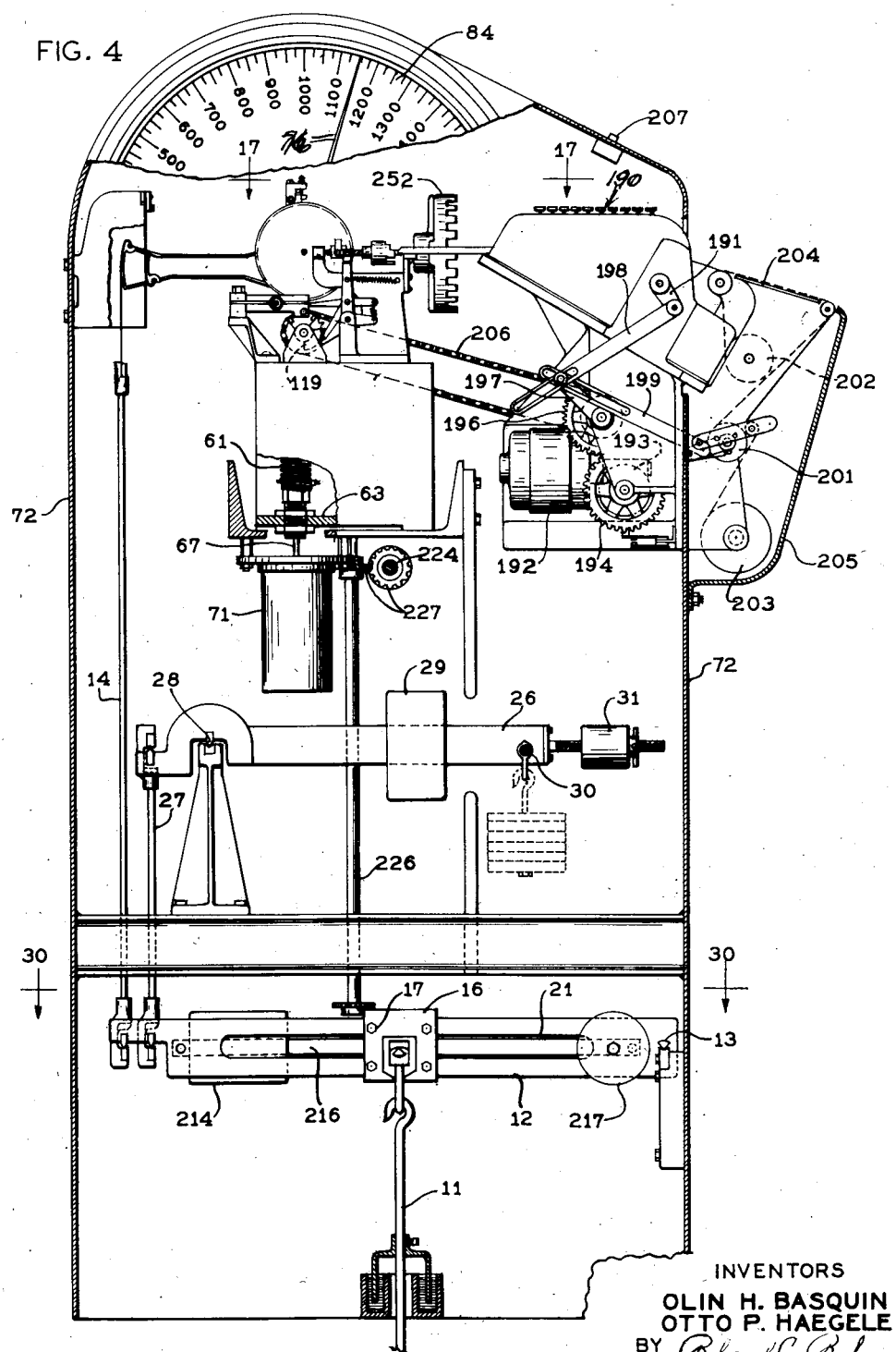
INVENTORS
OLIN H. BASQUIN
OTTO P. HAEGELE
BY Roland C. Rehm
ATTORNEY Sept. 27, 1938. O. H. BASQUIN ET AL 2,131,683
WEIGHING APPARATUS
Filed March 16, 1936 10 Sheets-Sheet 3
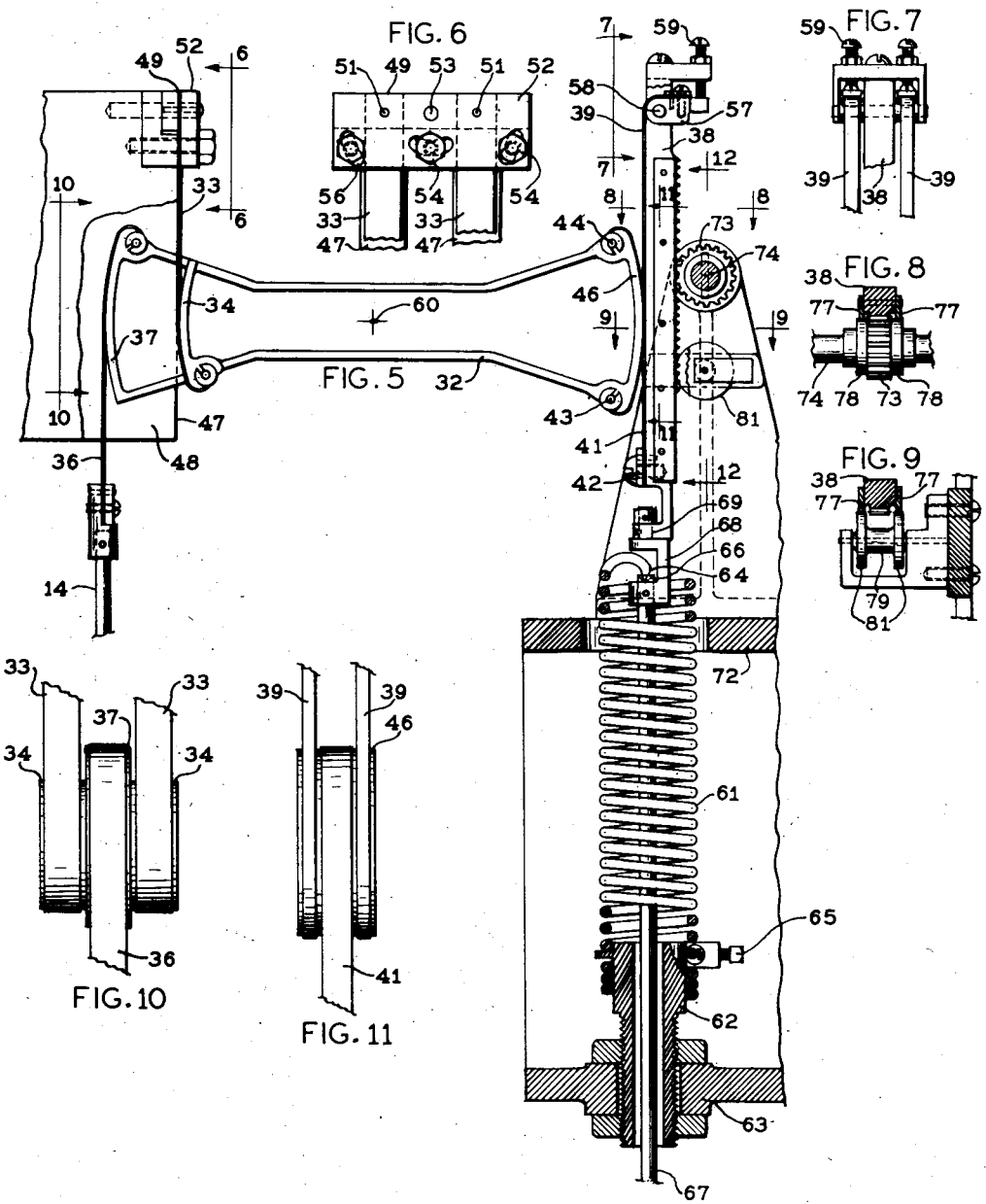
INVENTORS
OLIN H. BASQUIN
OTTO P. HAEGELE
BY Roland G. Rehm
ATTORNEY Sept. 27, 1938.  O. H. BASQUIN ET AL  2,131,683
WEIGHING APPARATUS
Filed March 16, 1936  10 Sheets-Sheet 4
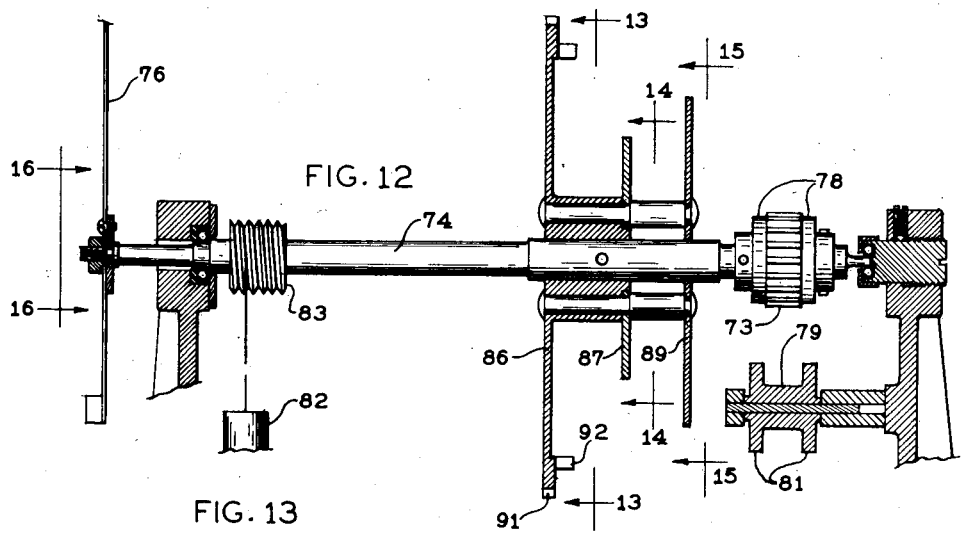
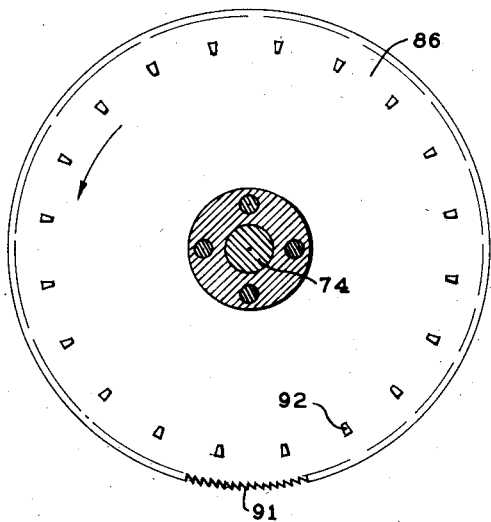
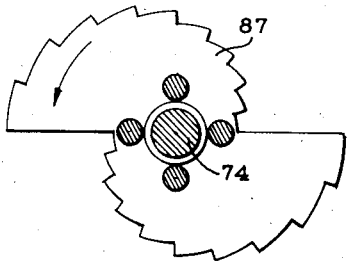
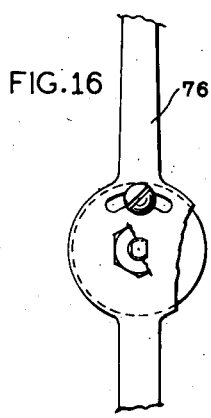
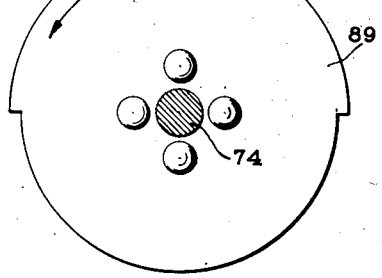
INVENTORS
OLIN H. BASQUIN
OTTO P. HAEGELE
BY
ATTORNEY

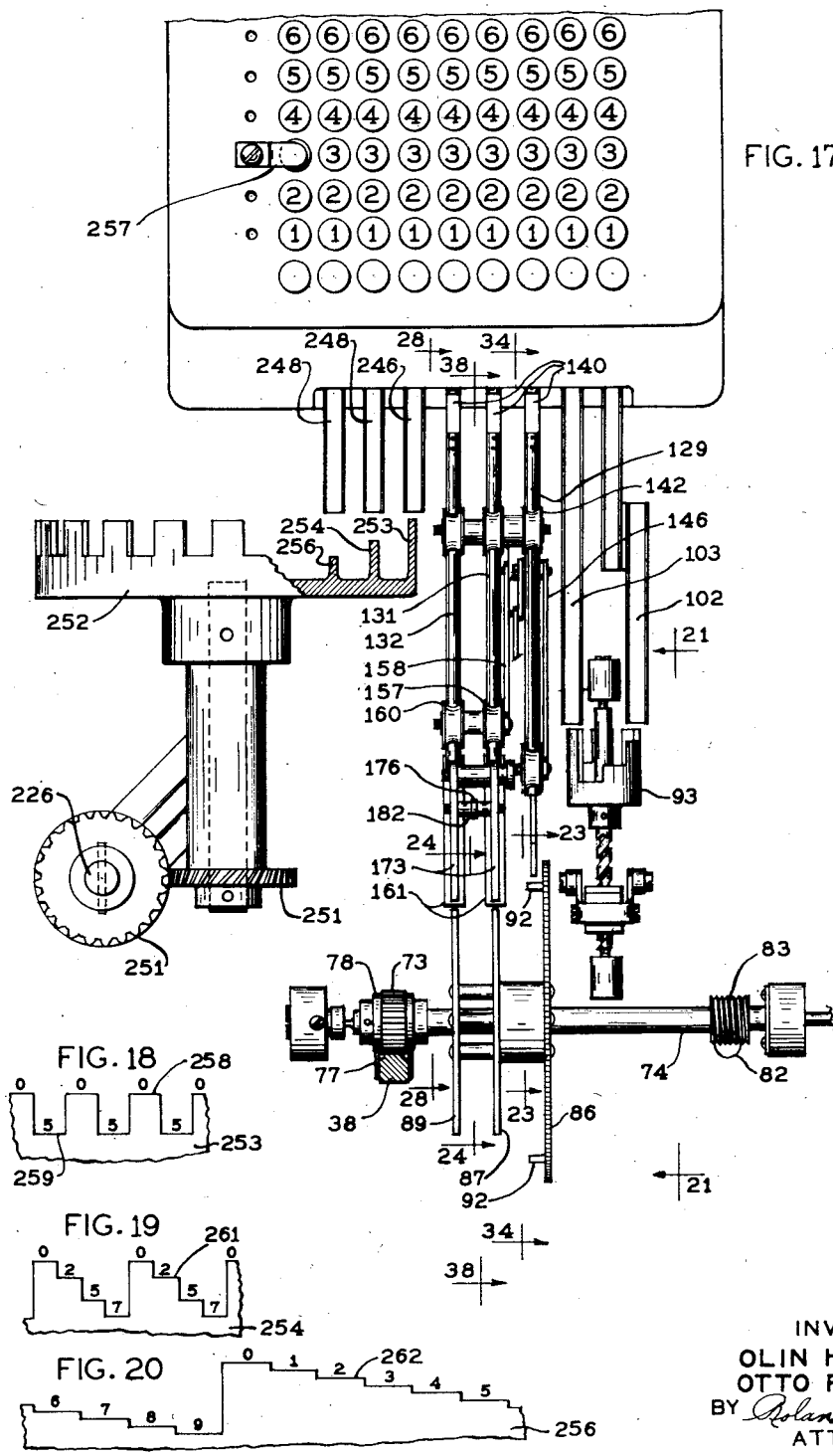

Sept. 27, 1938.    O. H. BASQUIN ET AL    2,131,683
WEIGHING APPARATUS
Filed March 16, 1936    10 Sheets-Sheet 6
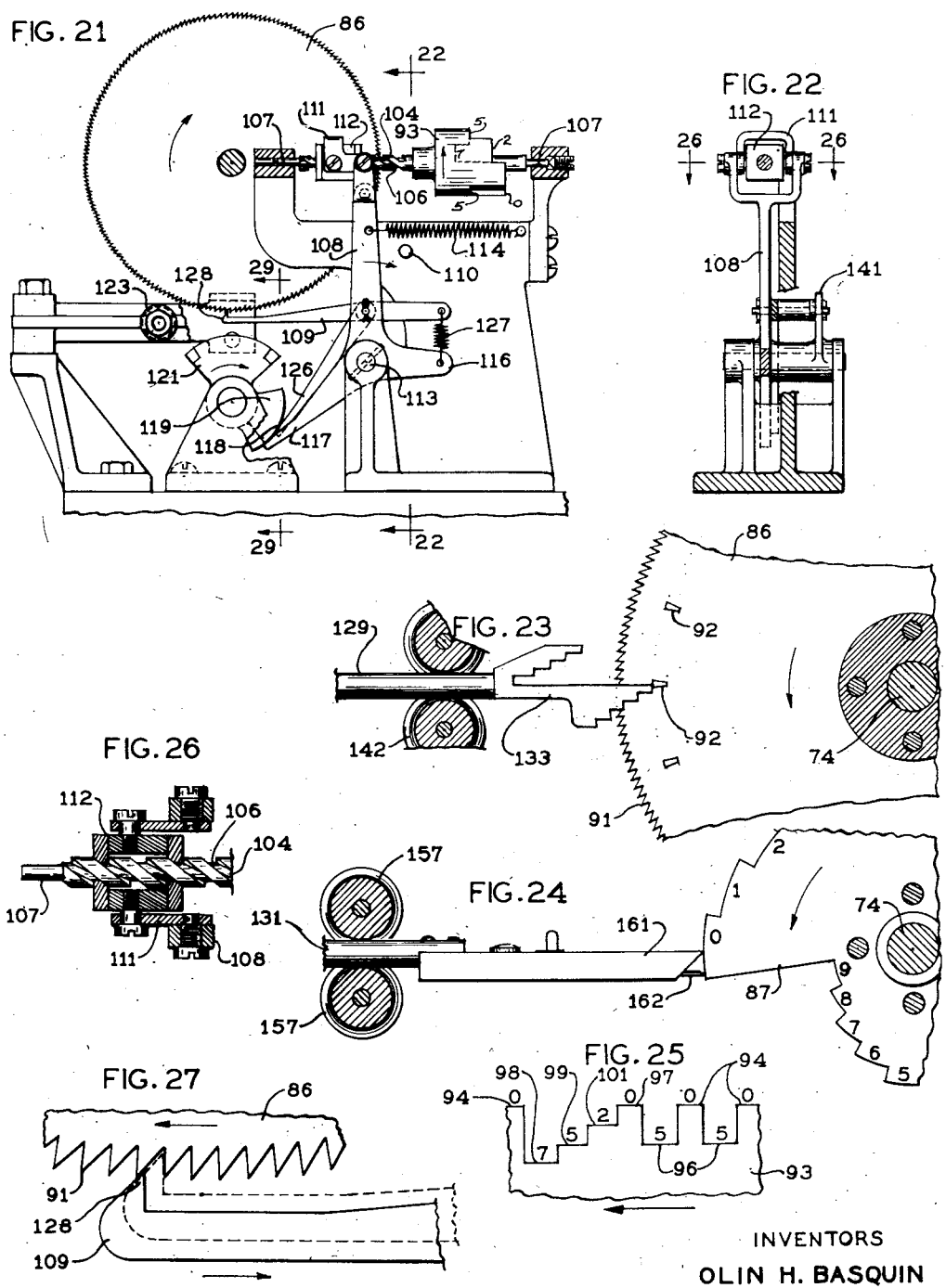
INVENTORS
OLIN H. BASQUIN
OTTO P. HAEGELE
BY Roland C. Behm
ATTORNEY

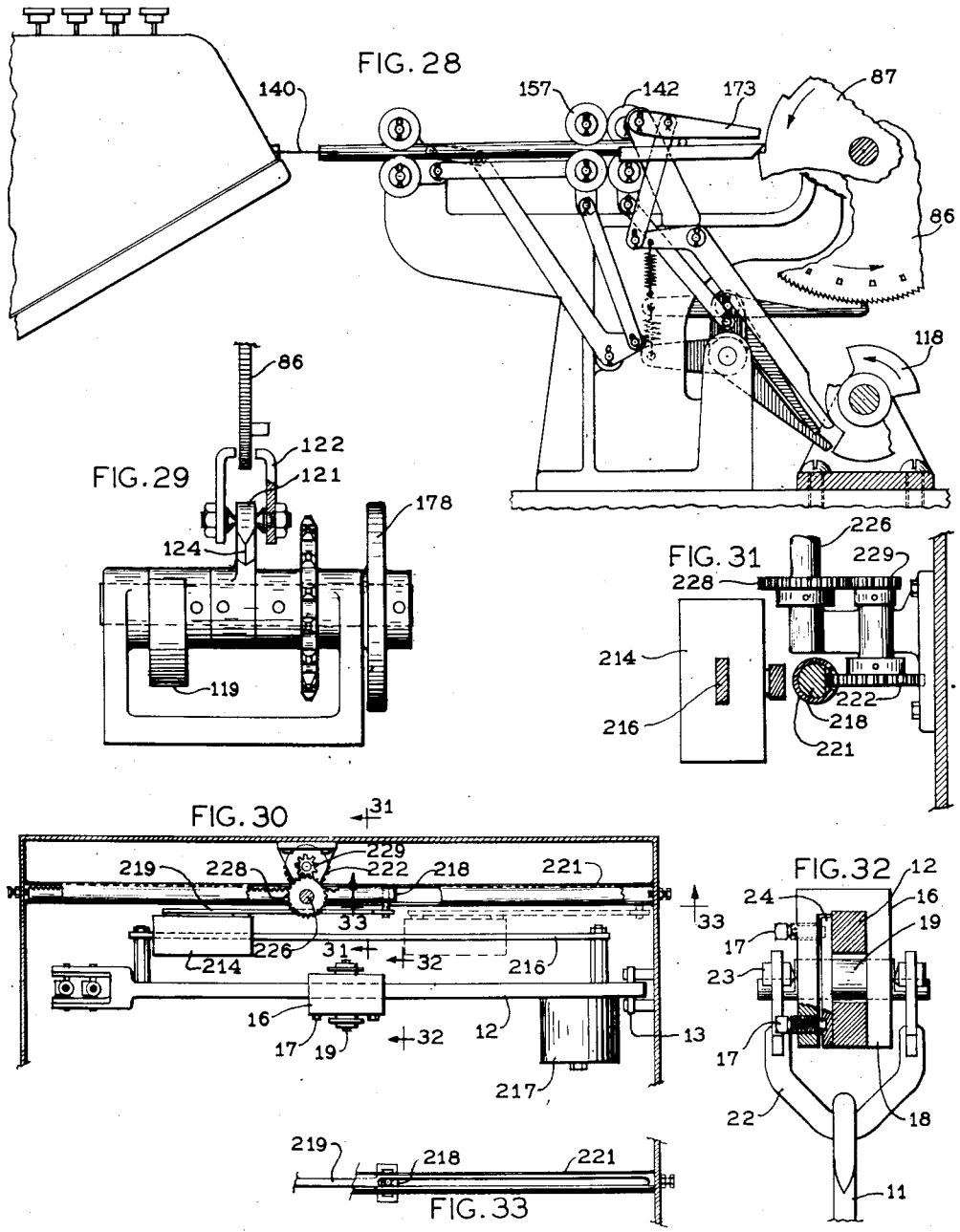

Sept. 27, 1938.  O. H. BASQUIN ET AL  2,131,683
WEIGHING APPARATUS
Filed March 16, 1936    10 Sheets-Sheet 8

INVENTORS
OLIN H. BASQUIN
OTTO P. HAEGELE
BY Roland C. Behm
ATTORNEY

Sept. 27, 1938. O. H. BASQUIN ET AL 2,131,683
WEIGHING APPARATUS
Filed March 16, 1936 10 Sheets-Sheet 9
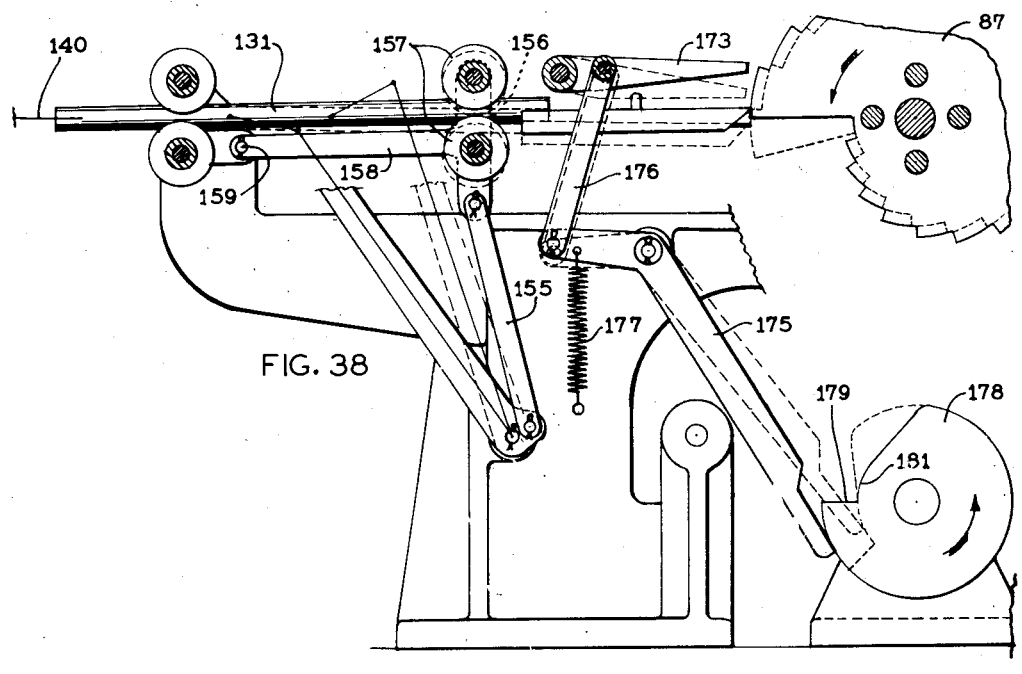
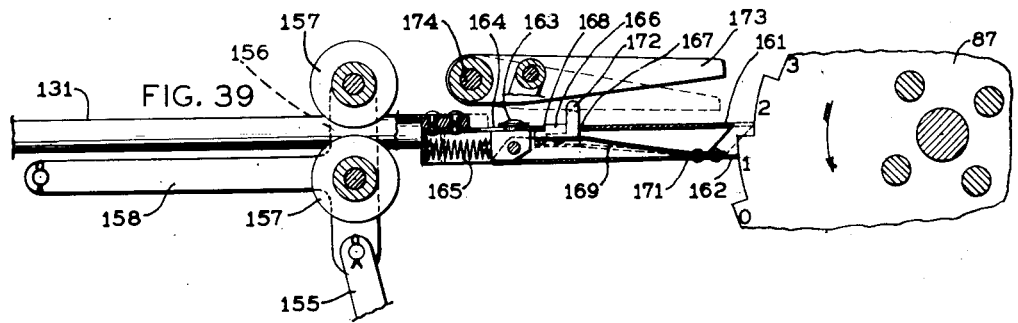
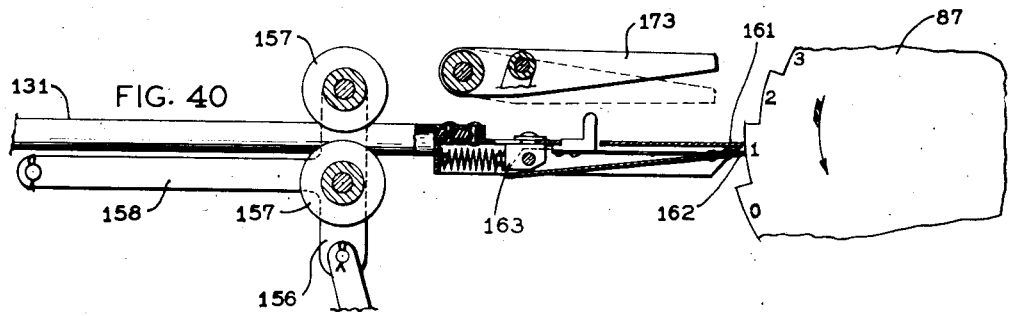
INVENTORS
OLIN H. BASQUIN
OTTO P. HAEGELE
BY Roland C. Behn
ATTORNEY Patented Sept. 27, 1938

2,131,683

UNITED STATES PATENT OFFICE 2,131,683

WEIGHING APPARATUS

Olin H. Basquin, Evanston, and Otto P. Haegele, Chicago, Ill., assignors to Streeter-Amet Company, Chicago, Ill., a corporation of Illinois Application March 16, 1936, Serial No. 69,080

32 Claims. (Cl. 265—5)

This invention relates to scales and, among other objects, aims to provide an improved, reliable and inexpensive recording scale.

The nature of the invention may be readily understood by reference to one illustrative construction embodying the invention and shown in the accompanying drawings.

In said drawings:

Fig. 1 is a general perspective view showing the scale platform and associated scale mechanism;

Fig. 2 is a detail section taken on the plane 2—2 of Fig. 3 of a portion of the tare weight adjusting mechanism;

Fig. 3 is an elevation of the tare indicating dial;

Fig. 4 is a front elevation of the scale mechanism including the system of levers for translating the pull of the steelyard rod to the weight indicating and recording mechanism, the housing surrounding the apparatus having been broken away to expose the mechanism on the interior;

Fig. 5 is an elevation on a somewhat larger scale of the floating lever for transmitting movement to the dial indicator shaft and recording mechanism at a constant ratio;

Fig. 6 is an elevation taken approximately from the plane 6—6 of Fig. 5 showing the means for anchoring and adjusting the supporting ribbons or tapes at one end of the floating lever;

Fig. 7 is a similar detail elevation taken from the plane 7—7 of Fig. 5 showing the method of connecting and adjusting the supporting tapes at the other end of the floating lever;

Fig. 8 is a plan section taken from the plane 8—8 of Fig. 5 showing the rack and the dial shaft pinion;

Fig. 9 is a similar section through the rack taken on the plane 9—9 of Fig. 5 showing the rack guiding roller;

Fig. 10 is an elevation taken from the plane 10—10 of Fig. 5 showing the arrangement of the ribbons or tapes at one end of the floating lever;

Fig. 11 is a similar elevation taken approximately from the plane 11—11 of Fig. 5, of the arrangement of tapes at the other end of the floating lever;

Fig. 12 is a vertical section through the indicator dial shaft and step cams taken on the plane 12—12 of Fig. 5;

Fig. 13 is a sectional elevation taken on the plane 13—13 of Fig. 12 of a composite step cam for controlling the setting of the "hundreds", "tens" and "units" digits in the recorded weight;

Fig. 14 is a sectional elevation taken from the plane 14—14 of Fig. 12 showing the "thousands" step cam;

Fig. 15 is a similar sectional elevation taken on the plane 15—15 of Fig. 12 showing the "ten thousands" step cam;

Fig. 16 is a detail elevation showing the indicating pointer adjusting devices taken approximately from the plane 16—16 of Fig. 12;

Fig. 17 is a plan view taken approximately from the plane 17—17 of Fig. 4, of the dial shaft and associated recording mechanism;

Figs. 18, 19 and 20 are developments of the "units", "tens" and "hundreds" steps on the tare cam;

Fig. 21 is an elevation, taken approximately from the plane 21—21 of Fig. 17, showing the mechanism for controlling the first two variable digits of the recorded weight;

Fig. 22 is a vertical section taken on the plane 22—22 of Fig. 21;

Fig. 23 is a sectional elevation taken from the plane 23—23 of Fig. 17 showing the devices for controlling the third digit of the recorded weight;

Fig. 24 is a similar view taken from the plane 24—24 of Fig. 17 showing the devices for controlling the fourth digit of the recorded weight;

Fig. 25 is a development showing the step sequence on the so-called "units" cam;

Fig. 26 is a plan section of a detail, taken on the plane 26—26 of Fig. 22;

Fig. 27 is a fragmentary elevation on a larger scale illustrating the operation of the devices for controlling the mechanism shown in Fig. 21;

Fig. 28 is a sectional elevation taken approximately from the plane 28—28 of Fig. 17;

Fig. 29 is an elevation taken from the plane 29—29 of Fig. 21 showing the clamping device for holding the dial shaft and associated elements during the taking of a record;

Fig. 30 is a plan view, partly in section, taken approximately from the plane 30—30 of Fig. 4 showing the tare poise adjusting mechanism;

Fig. 31 is a detail section taken on the plane 31—31 of Fig. 30;

Fig. 32 is a detail section taken on the plane 32—32 of Fig. 30 showing the adjustable connection for the steelyard rod;

Fig. 33 is an elevation on plane 33—33 of Fig. 30, showing the slot in the rack guide tube;

Fig. 38 is a view similar to Fig. 34, showing additional details of the correlating mechanism and taken on plane 38—38 of Fig. 17;

Fig. 39 is an elevation of secondary correlation mechanism shown in Fig. 38, but on a larger scale;

Fig. 40 is a view similar to Fig. 39, showing the mechanism in a different position;

Figure 34:
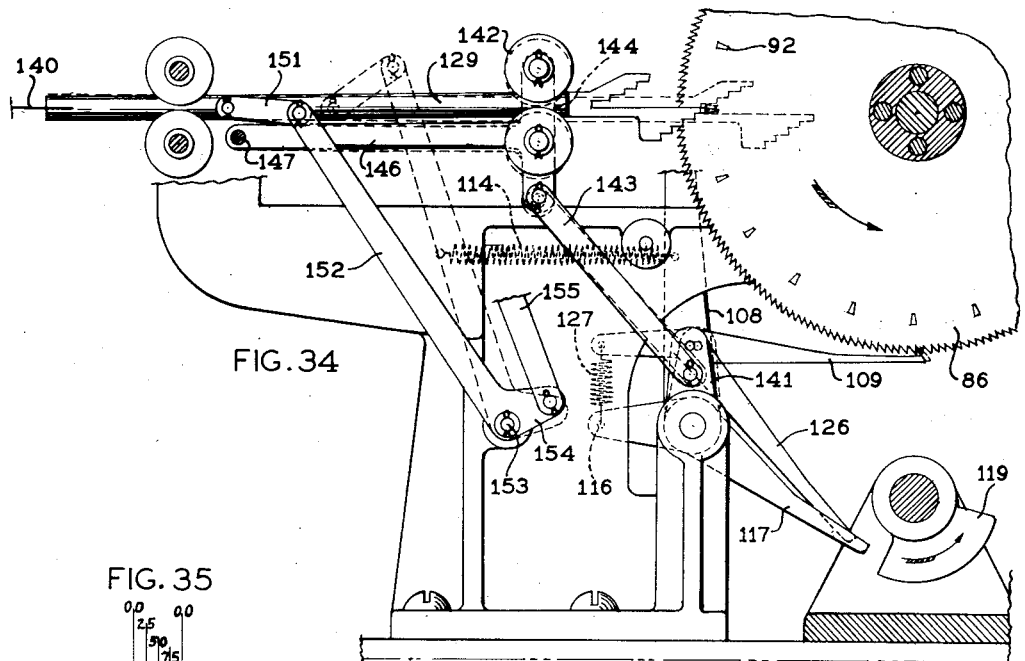
Fig. 34 is a sectional elevation of correlating mechanism, taken on plane 34—34 of Fig. 17, and showing, on an enlarged scale and from the opposite side, a portion of the mechanism illustrated in Fig. 21.

Reliable commercial recording scales have not only been expensive but generally do not possess all the desirable features which should characterize a scale of this type. For example, in addition to a visual indication of the weight, it should be possible, if desired, both to print and totalize a succession of weights. To adapt it to a variety of fields of use, the apparatus should also be capable of printing the tare weight. Apparatus which has heretofore been proposed for some of the foregoing purposes has been so complex and unreliable as to render the same impractical for commercial use as an instrument of precision.

The invention is here shown embodied in a scale capable of visually indicating, printing and totalizing the weights of loads and of visually indicating and printing the tare setting. As will presently appear, the recording mechanism will print the weight of a load as closely (i. e., to as small a unit or increment) as it can be read from the dial or other visual indication. Interpolation of the latter, therefore, is not necessary to secure a closer weight reading than can be obtained from the printed record of the weight. Indeed, it is easily possible to design the mechanism to extend the printed weight to units much smaller than those which can be obtained from reading the dial. Generally, however, it is satisfactory if the "unit" of the recorded weight be one eight hundredth to one one thousandth of the capacity of the scale, since this represents approximately the limit of practical subdivision of the ordinary scale dial. For a scale of the capacity of twenty thousand pounds, a satisfactory unit weight is therefore twenty-five pounds.

The mechanism here shown for transferring the force of the load to the indicating and recording mechanism is generally similar to that shown in co-pending application Serial No. 746,310. It has low inertia and, therefore, comes to balance quickly but it may, if desired, be equipped with the periodic damping mechanism of my said former application, if still greater speed in weighing is desired.

The pull of the load on the main lever system of the scale is transmitted through the steelyard rod 11 to a variable ratio lever or beam 12 (Figs. 4 and 32) by means of which the apparatus may be adapted without redesign or extensive alteration of parts to a large range of scale multiples. Lever 12 being in this instance a second-class lever, is supported at one end by the knife edge 13 and is connected at the other end by an appropriate knife edge or the like to the rod 14 which transmits the pull of the load to the counterbalancing mechanism. To permit adaptation of the recorder to various scales of differing multiple, the rod 11 is shown connected to a longitudinally adjustable knife edge support 16 (Figs. 4 and 32) which may be clamped by set screws 17 at any desired position along beam 12. Thus it is possible by adjusting the knife edge device 16 along the beam to keep the range of tensions transmitted by the rod 14 to that for which the counterbalancing device (spring or pendulum) and its associated mechanism are designed. As shown more particularly in Fig. 32, the knife edge device comprises a yoke 18 which embraces the beam 12 and carries a knife edge 19 which travels in the slot 21 in the beam. A yoke 22 carrying the knife edge seats 23 which bear upon the knife edge provides the connection for rod 11. The set screws 17 bear against clamping plate 24 which directly engages the beam.

The dead load counterbalancing means which in this instance is separate from the live load counterbalancing device is represented by a first-class beam lever 26 connected by tension rod 27 to beam 12. Beam 26 is supported at the knife edge 28 and carries a dead load poise 29 and a balance ball 31, both of which may be adjusted from time to time as the dead load of the scale system varies. Beam 26 is also advantageously provided with a conventional device 30 by which test weights may be applied to test the apparatus.

For many classes of installation it is preferable to close and seal the apparatus, as in this case, to prevent shifting of poise 29 or ball 31, or other tampering except when representatives of all interested parties are present.

The pull from rod 14 is transmitted to the counterbalancing device and to the weight recording and indicating mechanism by a device which translates the pull at a constant ratio throughout its range of movement without variation on account of angularity. The device is shown in the form of a rocker or floating lever 32 preferably made of some light weight material such as an alloy of aluminum or magnesium (Figs. 4 and 5) supported at one end by a pair of flexible steel tapes 33 which wind upon arcuate surfaces 34 of the lever as the latter oscillates. The tapes provide a somewhat simpler means than gear teeth for insuring a non-slipping rolling action of lever 32 along surfaces 47.

Rod 14 is connected to the lever by tape 36 which winds and unwinds on the arcuate surface 37 at the end of the lever. The other end of the lever is connected to the rack bar 38 in this instance by oppositely extending tapes 39 and 41. The former are spaced twin tapes which are fixed to the upper portion of the rack rod and the latter a single tape between the twin tapes which is attached to rack bar 38 at 42. The other ends of the tapes are respectively connected to the lever at 43 and 44 and wind and unwind upon the arcuate surface 46 of the lever. The supporting tapes 33 hang against the vertical surfaces 47 presented by the support 48 to which the tapes are connected at 49. The surfaces 47 are spaced to allow the end of the lever to extend between them. Thus in oscillating, the lever 32 in effect rolls up and down the vertical surface 47. To equalize tension in tapes 33, the latter are carried on pins 51 projecting from a tiltable clamping plate 52 pivoted at 53 (Fig. 6). Clamping bolts 54 pass through slotted openings 56 in the plate and serve to hold the latter in such position as is necessary to maintain equal tension in the tapes. It is possible by this means to adjust for slight variations in the length of the tapes and for the slight inaccuracies or imperfections.

Similar adjustment to equalize tape tension is provided for the tapes 39. The latter are attached to rocking anchoring devices 57 (Figs. 5 and 7) pivoted at 58 on the rack bar. Devices 57 may be adjusted by screws 59 not only to equalize tape tension but to eliminate any lost motion by drawing tape 41 taut.

The cylindrical surfaces 34, 37 and 46 are coaxial and their radii are not small. The center of gravity of rocker 32 is at or near the axis of the cylindrical surfaces. The tapes 33, 36, 39 and 41 are very strong, very thin and very flexible. So long as their tensions are not small, the free portions of these tapes are practically tangent to their cylindrical surfaces. The directions of the tapes and the line of travel of the rack rod remain fixed and in this instance parallel. Under these conditions a constant ratio is maintained between (1) changes in tension of tape 36 and (2) changes in tension of tape 41, for all positions of lever 32.

It will be apparent from the foregoing that the lever or rocker 32 serves the purpose of the conventional weighing beam without the latter's inherent disadvantages. The lever should preferably be made of strong and stiff material which does not readily corrode and which may easily be machined. Preferably the center of gravity of the lever should lie at or near the axis 60 which is the center of the three arcs 34, 37 and 46 and which travels in a straight line parallel to the surfaces 47. Otherwise there will be some slight variation, in different positions of the lever, of the latter's moment about the surfaces 47 which theoretically at least might introduce some inaccuracies in the scale readings. In the present instance, axis 60 of the lever is located approximately at the middle of the lever and therefore can easily be made to coincide substantially with the center of gravity of the lever.

It is preferable for good operation to design lever 32 with the radii of arcs 34, 37 and 46 as large as practicable. Radii of four or five inches are desirable. This minimizes the bending stress in tapes 33, 36, etc., and the bending moment required to bend them. The tapes should preferably be quite thin (in this instance about four thousandths of an inch) and should be of sufficiently high elastic limit to be elastic throughout the range of stresses imposed thereon. The bending stress in such a ribbon bent over an arc of four inch radius would be approximately fifteen thousand pounds per square inch. If bent to smaller radii, the fiber stress would be proportionately higher and with an arc of one inch radius for example, the fiber stress would be approximately sixty thousand pounds per square inch, which involves a serious reduction in the portion of strength available for the tensile stress imposed on the ribbons by the load and the counterbalancing forces.

Preferably also, the free portions of the ribbons should be substantially parallel and vertical.

The load counterbalancing device is in this instance represented by a spring 61 connected at its upper end to the rack bar and at its lower end to a threaded member 62 anchored to a portion 63 of the frame in which it may be vertically adjusted in accordance with the desired active spring length. The upper end of the spring has a point contact with the rack bar so that it may twist slightly relative to its other end during its elongation and contraction. It has been observed that when a spring is elongated it tends to twist and that if it be held against twisting, its elongation will not be quite proportional with the applied force. As here shown, the terminal end of the spring is hooked downwardly with its point 64 lying in the axis of the spring and resting in a conical depression 66 in the rod 67. The spring is thus permitted to twist freely on its own axis during its elongation and contraction and thereby does not introduce other forces which would disturb its elongation exactly according to Hooke's law. Rod 67 is carried by a yoke 68 which is swiveled at 69 to the rack bar to allow rotation of the entire spring around its anchor 62 when adjustment is made of the number of active coils in the spring, after which the spring is locked by set screw 65 to the anchor.

The rod 67 may advantageously be directly connected to the piston of the dashpot 71 which serves to damp out excessive oscillation and bring the system quickly to rest in counterbalanced position. If the periodic damping mechanism of said co-pending application be desired, it is substituted for the dashpot and may act directly upon rod 67.

Preferably the spring, tapes, etc. are maintained at a uniform temperature to eliminate the slight errors which might otherwise occur. The upper portion of the housing 72 is, therefore, closed off and made tight (and also preferably heat insulated) so that it may be maintained by a thermostatically controlled heating means, such as an electric light, at a uniform temperature.

Rack 38 operates, through pinion 73, a shaft 74 on which is mounted the indicator or dial pointer 76 and the various step cam devices (presently described) for setting the recording mechanism. To eliminate error which may be introduced by lateral relative movement between the pinion and rack, the same are provided with pitch line guides which when pressed together compel engagement at the pitch line common to rack and pinion. In the present instance, the rack is provided with a pair of straight guides or bars 77 (Fig. 8) whose edges register exactly with the pitch line of the rack teeth and the pinion carries corresponding surfaces 78 opposite the bars 77, which surfaces are located exactly at the pitch line of the pinion teeth. Spaced a distance below the rack is another guiding roll 79 having flanges 81 over which the rack guides roll and which in cooperation with the pinion, guide the rack pitch line in a fixed line exactly tangential with the pitch line of the pinion teeth. A small weight 82 whose flexible connection winds and unwinds on a drum 83 on shaft 74 (Fig. 12) serves to prevent disturbance by any slight back lash between the pinion and rack teeth and always to maintain contact between the same tooth faces of pinion and rack.

With the foregoing arrangement, the rotation of shaft 74 is so nearly proportional to the displacement of the rack that the error is negligible. It is unnecessary for example to space the graduations on the dial 84 in a non-uniform relationship to fit the peculiarities of a given system. Dial graduations may be uniform throughout the range of the dial, and dials are, therefore, interchangeable.

To equip the apparatus for printing or recording weights of successive loads, the dial shaft is provided with devices which control recording or printing mechanism. In the present instance, such devices are in the form of step cams comprising the so-called "toothed disc" 86 which controls an auxiliary cam giving the first two digits of the weight record, and which also has combined with it means for setting the third digit of the weight, step cam 87 for controlling the fourth digit of the weight, and step cam 88 for controlling the fifth digit. It should be understood that if the capacity of the scale be such that the increment of weight recorded is ten pounds or one hundred pounds or whole multiples thereof, the final one or more digits will be zero. These preferably are printed upon the weight record independently of the step cams. The step cams simply need, therefore, control only variable digits.

To reduce subdivision of the "units" step cam, the toothed disc 86 is not itself subdivided into steps representing the first two digits of the weight record. In the present instance it is divided into steps each of which represents one hundred pounds, each step controlling an intermediate device presently described (see Fig. 21), which sets the first two variable digits of the weight record. Thus for a scale whose capacity is twenty thousand pounds, the toothed disc 86 need be provided with only two hundred steps 91 which in the present instance are in the form of identical teeth, one face of which is radial and the other inclined. On a disc of five or six inches in diameter, these teeth are of substantial size and can be readily and cheaply machined in the disc.

Associated with disc 86 is a series of identical equally spaced lateral projections 92 which, as will presently appear, serve to set the third variable digit (in this case the "hundreds") of the weight record. These are one-tenth as numerous as the teeth 91, are readily manufactured, and add little to the weight or inertia of the rotating system.

The "units" and "tens" digits, i. e., the first two variable digits of the weight record, are set in this instance by a simple and easily made rotary step cam 93 in which the steps are of practicable size because a magnification is given by the mechanism which controls its settings in harmony with those of steps 91. In this connection it should be noted that cam 93 does not rotate with disc 86 and thus involves no addition to the inertia of the dial shaft system. In the present instance the units weight is twenty-five pounds aggregating four increments per one hundred pounds, and the step cam, therefore, requires only four steps for each of the "units" and "tens" orders. The cam 93 may, therefore, be relatively small without resulting in objectionably narrow steps. Where the increments are smaller, a larger number of steps will be required and the step cam may be given a full revolution instead of one-half revolution which is ample for the small number of steps in the present apparatus. Therefore the steps on one-half the circumference of the cam may be arranged to control the "units" digits and the steps on the other half control the "tens" digits (Fig. 25).

As shown more particularly in the latter figure, which illustrates a development of the steps on cam 93, the "units" half of the cam comprises four steps,—two of each kind, the high step 94 being "0" steps and the low steps 96 being "5" steps. The other or "tens" half of the step cam also comprises four different steps, the high step 97 being the "0" step, the lowest step 98 being the "7" step, 99 being the "5" step and 101 being the "2" step.

The step widths may, of course, be widened by increasing the diameter of the barrel of the cam or by employing two concentric rows of steps, one for each of the digits in the "unit" weight, somewhat as shown in tare cam 202 presently described. Preferably cam 93 should be of small diameter and light in weight so that it may be moved and stopped quickly without developing objectionable stresses.

The aforesaid steps serve to set respectively cam engaging elements in the form of "units" finger 102 and the "tens" finger 103 of the recording mechanism (Fig. 17). The latter fingers may be connected by appropriate mechanism to type bars or the like for printing the weight or to any appropriate totalizing mechanism such as, in the present case, to the digit slides of an ordinary adding machine. While many types of adding machines might be employed, that here shown is a Corona adding machine. As appears more particularly from Fig. 17, the fingers 102 and 103 engage step cam 93 at diametrically opposite points and as illustrated in Fig. 25, the cam steps are so coordinated that successive rotative positions of cam 93 represent readings of "00", "25", "50", and "75".

In this connection it should be understood that the expressions "units", "tens", "hundreds", etc., refer to the variable denominational orders in the weight of the load, and that additional terminal "zeros" are ignored. In high capacity scales, such terminal zeros are added not by the regular weight printing mechanism but by supplying the tape with terminal "zero" or "zeros" already printed thereon.

The mechanism for controlling cam 93 is represented by a screw 104 having a steep helical thread 106 which screw, together with the cam 93 affixed thereon, is mounted in bearings 107. Rotation of the screw is effected by lever 108 whose position is controlled by pawl 109 and the "units" disc 86. The upper end of the lever is connected by means of a link 111 to a nut 112 which operates upon the thread 106 and serves to rotate the screw when moved longitudinally. The other end of the lever is pivoted at 113 and is urged in a direction toward cam 93 (Fig. 21) by spring 114. The lever is normally held in what corresponds to "75" position of cam 93 (i. e., at the left-hand limit of its range of movement, Fig. 27) by the engagement of arm 117 (rigid with lever 108) with the cam surface 118 on a rotary cam 119.

The latter also carries a lateral cam member 121 which operates a clamping or locking device for holding the dial shaft and the cams thereon in fixed position while the recording mechanism is being set by the step cams. The locking or clamping device is here represented by a pair of clamping members 122 which normally exert a clamping action upon disc 86 (Fig. 29) and which are separated to release the cam and the dial shaft, by the rotation of cam 121 (whose leading end 124 is beveled) between the clamping members.

Upon periodic rotation of cam 119 (which occurs after the scale has come to balance), cam member 121 clears the clamping members allowing them to exert a clamping action on the disc 86. A slight further rotation carries cam surface 118 beyond arm 126 rigidly connected to pawl 109, allowing the latter to engage the steps 91 on disc 86 towards which it is pressed by spring 127 connected at its other end to arm 116 of lever 108. The latter spring is relatively weak and therefore does not interfere with the subsequent movement of lever 108 by spring 114. Immediately after the aforesaid operation of lever 109, cam 118 clears lever 117 releasing lever 108 and allowing it to be pulled to the right (Fig. 21) by spring 114 until the point 128 of the pawl is fully seated in a notch in disc 86. The inclined face of a tooth 91 serves as a cam against the inclined face of point 128 to move the latter from its initial position. Disc 86 being held against movement, the distance to which lever 108 moves to the right is determined by the relative position between the point 128 on pawl 109 and the notch between a pair of teeth 91 on disc 86 (see Fig. 27). In other words, the positions assumed by that radial edge of tooth 91 which lies just to the right of the initial or waiting position of the point 128 of pawl 109, determined the amount of travel of the latter and, therefore, the position of cam 93.

Figure 35:
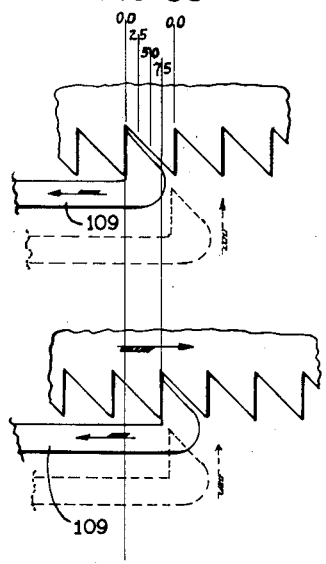
Fig. 35 is a diagram of two positions of the controlling pawl of Fig. 21, but viewed from the elevation of Fig. 34.

The range of movement of pawl 109 is slightly less than the tooth spacing on disc 86, being held in the initial or "waiting" position by cam 118 and arm 117, and limited in its travel toward cam 93 by stop 110. Movement beyond the stop is unnecessary and would only serve to increase the force necessary to stop cam 93. Since there are, in this instance, only four significant positions of cam 93, namely "00", "25", "50" and "75", the range of movement of pawl 109 may be divided into four imaginary zones corresponding respectively to such positions. In the order of extent of movement of pawl 109 from its initial or "waiting" position, the successive zones correspond to "75", "50", "25", and "00." (See the diagram of Fig. 35.) If the radial face of a tooth 91 stops in the "00" zone, as shown in the first position of Fig. 35, pawl 109 will have its maximum movement from its initial position. On the other hand, if the radial tooth face stops in the opposite zone "75", (as shown in the second position of Fig. 35) the pawl will have a minimum travel from its initial position.

In the mechanism illustrated, the lever arm ratios are designed to multiply the maximum movement of pawl 109 to give nut 112 maximum travel of about five-sixteenths of an inch.

The recording mechanism here shown is, as stated above, in the form of an ordinary adding machine in which the conventional digit slides 130 of the machine are provided with step cam engaging elements in the form of externally projecting fingers to make it possible to set the slides by the respective step cams instead of the usual keys which are not necessary in this instance and may be dispensed with. The "ones" digit slide is provided with an offset extension finger 102 to accommodate the cam 93 which is wider than the usual spacing between the adding machine bars and the banks of keys. The opposite periphery of the step cam is placed in direct alignment with the "tens" finger 103. The other step cams are spaced so as to be in alignment with the "hundreds", "thousands" and "ten thousands" fingers 129, 131 and 132 respectively.

"Hundreds" finger 129 is provided with a stepped extremity 133 (Figs. 23, 36, and 37) comprising ten steps, that nearest the dial shaft 74 being the "0" step and the most remote step being the "9" step. The advance of finger 129 is determined by the position of projections 92 on disc 86 relative to the series of steps on the finger. The height of the step risers are determined by the design of the adding machine, being that distance necessary to effect a setting of successive digits in the adding machine. The circumstance that the projections 92 on disc 86 travel in a path which is slightly curved instead of being exactly perpendicular to the risers of the several steps, requires compensation in the relative heights of the steps. For mechanical reasons, the "0" or highest step is preferably placed near the middle of the series of steps, so that its line of travel (extended) intersects the axis of the dial shaft, thereby dividing the steps in two series,—the first comprising steps from "0" to "4" and the second, steps from "5" to "9". It will be noted that the riser leading to the "9" step is somewhat higher than for the other steps. The "9" step is unnecessary as a means of positioning finger 129, since the "9" digit in the adding machine will be set up independently of engagement with a step 92, if and when finger 129 is allowed to have the maximum forward advance provided by the adding machine.

As shown in Fig. 23, the dial shaft is in position to register "0" for the "hundreds" digit, that is, it is in such position that a projection 92 is in alignment with the "0" step on "hundreds" finger 129. When a projection 92 is moved in a counterclockwise direction so as to clear the "4" step, the next following projection 92 will engage one of the second series of steps "5"—"9". It is apparent that the stepped extremity on finger 129 permits a very substantial simplification of disc 86 as compared to a step cam having at least ten series of ten steps each; unless the step cam were prohibitively large the steps would be so minute as to make reliable operation impossible. Both disc 86 and the stepped extremity 123 are simple in design and require only ordinary precision in their manufacture.

The "thousands" step cam 87 (see Figs. 14 and 24, 39 and 40) comprises two sets of ten steps each, representing the range between "0" and "20,000". Each of such steps itself represents an angular spacing of about 18° on the cam and is of such substantial width as not to present any difficulties in reliability of operation or in manufacture. The same applies also to the "ten thousands" cam 89 which has in this instance only two steps, one representing "0" and the other "10,000". These steps serve to set the "10,000" finger 132 either in a "0" position or in "10,000" position.

Correlating mechanism is advantageously provided to avoid error which may occur at critical or transition points, i. e., when the digit of the next lower denominational order of digits is near a "0" or "9" position, thereby placing the finger for the next higher digit opposite either the inside or outside edge of the proper step. At such critical or transition points, even with highly precise machine work, it would occasionally be inevitable without correlating mechanism, that a finger would either improperly engage the next higher step or slip off the corner of one step onto the next lower. In this instance compensation is made by adjusting the normal relative positions of the ends of the fingers and their respective step cams (in this case by raising or lowering the fingers) to insure registry of the finger with the proper step on the cam.

The mechanism for effecting the aforesaid adjustment is advantageously designed not to require modification of the operation of the adding machine, wherein the digit slides are simultaneously advanced and a record is made almost immediately (though not instantly) after the digit slides and their fingers have been set by the respective step cams. While successive adjustment of the denominational orders is undertaken, the mechanism is so designed as to allow all the digit slides and the fingers connected therewith, to advance toward the step cams simultaneously, and the mechanism here shown effects such adjustment without interfering with the normal operation of the adding machine.

In the present instance adjustment of the "ones" and "tens" fingers 102 and 103 is unnecessary, since the error which might be caused by an incorrect setting of either a "ones" or "tens" finger would immediately be apparent in an irregular reading such as "05", "20", "55", and "70", revealing the need of adjustment. The "hundreds", "thousands", and "ten thousands" fingers 129, 131 and 132 are advantageously flexibly connected at 140 to the respective digit slides of the adding machine, thereby making it possible freely to elevate or depress the fingers relative to the adding machine digit slides. In the present arrangement, the adjustment of the respective fingers is such that their position, when the digit of a preceding order is at or near "0", is higher than their adjusted position when the digit of the preceding order is "9". While in this instance the adjusting mechanism is operative for intermediate digits, such adjustments are generally not necessary, but, of course, do no harm.

Figure 36:
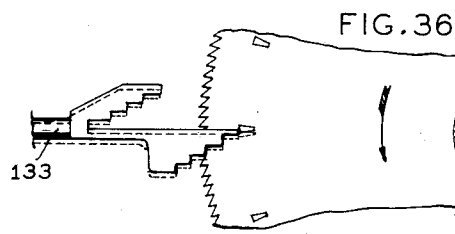
Figs. 36 and 37 are diagrammatic views showing two positions of the step cam mechanism of Fig. 23.
Figure 37:
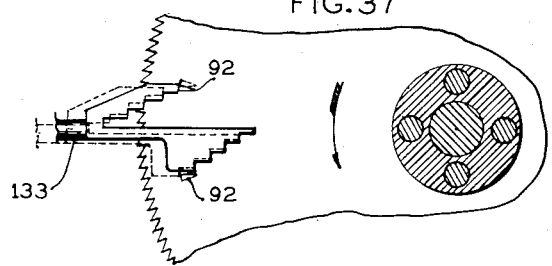

Correlation or adjustment of the "hundreds" finger 129 is here effected by an offset arm 141 connected to and movable with lever 108 (Figs. 22 and 34) which is connected to guide rolls 142 (by which the line of movement of finger 129 is determined) by a link 143, which raises or lowers the guide rolls. It should be noted that cam surface 118 clears arm 126 shortly before it clears arm 117, thereby allowing pawl 109 to determine the correlation or adjustment which is effected by lever 108. The frame 144, carrying the guide rolls, is here shown supported by an arm 146 pivoted at 147. Maximum elevation of guide rolls 142 (and therefore of finger 129) occurs, as previously explained, when pawl 109 and lever 108 have their maximum movement, namely, for a "00" setting of disc 86. A minimum movement of pawl 109 occurs for a "75" setting in which position, guide rollers 142 are at their lowest point, which is their normal position, as determined by the initial or "waiting" position of pawl 109. Therefore, the degree of elevation of rollers 142 and finger 129 depends upon the proximity of the setting to a "00" position. The foregoing adjustments of finger 129 and its stepped extremity 133 are illustrated in Figs. 36 and 37. In Fig. 36 the full line position indicates a "000" setting, this being the highest position of the finger as determined by the "00" position of the lower order digits. The dotted line position is that for a "075" setting, being the lowest position of steps 133. In Fig. 37, the full line or high position of steps 133 represent a setting for "500", the "5" step on the second series of steps being shown in engagement with the succeeding projection 92. In the dotted line or lowest position (which represents a "475" setting) the "4" step of the first series of steps is shown in engagement with the adjacent projection 92.

Correlation or adjustment of the "thousand" finger 131 is controlled by "hundreds" finger 129, which has it farthest advance for a "9" "hundreds" digit, and its minimum advance for a "0" digit. As here shown (Figs. 34 and 38), finger 129 is connected through link 151 to bell crank lever 152 pivoted at 153. The other arm 154 of the latter is connected by link 155 with the frame 156 carrying guide rolls 157, which frame is shown carried by link 158 pivoted at 159. The extent of advance of finger 129, therefore, determines the vertical adjustment of the guide rolls 157 which direct the "thousands" finger 131. As shown in Fig. 34 (in full lines), guide rolls 157 are at their maximum elevation for the "0" position of the "hundreds" finger, and (as shown in dotted lines) at their lowest point in the "9" position of "hundreds" finger 129. It is satisfactory in the present apparatus where the steps of the "ten thousands" cam 89 are wide as compared to the maximum adjustment or correlation given the fingers, to effect adjustment of the "ten thousands" finger 132 by the same mechanism as controls that for the "thousands" finger 131. Guide roll frame 156, carrying guide rolls 157 for the "thousands" finger may, therefore, also carry guide rolls 160 for the "ten thousands" finger 132 (Fig. 17). With this arrangement, finger 132 will receive many unnecessary adjustments, but these do no harm.

Where the apparatus has a larger capacity, requiring a larger number of steps on the "ten thousands" cam, the "ten thousand" finger may require independent adjustment controlled by the "thousands" finger 131 in the same manner and by mechanism (Figs. 37 and 38) similar to that for correlating the "hundreds" and "thousands" fingers.

As explained above, on operation of the adding machine, the several fingers 102, 103, 129, 131 and 132 advance simultaneously at the same controlled speed, each slide or finger continuing its movement until it engages its step cam. In the present design such advance occurs immediately after the barrel step cam 93 has been set (and the guide rollers for the "hundreds" finger have been correspondingly adjusted or correlated) but before any adjustment or correlation for the "thousands" and "ten thousands" fingers has taken place. Auxiliary mechanism is provided to insure the effective operation of the correlating mechanism for the "thousands" and "ten thousands" fingers, notwithstanding the fact that their advance starts before correlation takes place.

Where, as here, the degree of advance of the cam engaging fingers increases from "0" to "9", it is inevitable (with simultaneous advance of the fingers) that a step cam set in "0" position, (that is, with the highest step in alignment with its finger) will be engaged by its finger before other fingers will engage a "1", "2", "3", etc., step. For example, if the setting be "1,900," the "thousands" finger would ordinarily engage the "1" step before the "hundreds" finger would engage its "9" step. If the "thousands" finger should erroneously engage the lower or "2" step, it would be impossible for the adjusting mechanism controlled by the "hundreds" finger in the "9" position to adjust the "thousands" finger downwardly, because it could not be retracted to pass over the riser on the "1" step.

The aforesaid auxiliary mechanism functions to arrest or check temporarily the advance of a finger, until its correlating mechanism has had opportunity to complete a safe portion of the adjustment for such finger, after which the finger is released, thereby insuring engagement with the proper step of its cam. In the present instance, the "thousands" finger 131 (Figs. 38, 39 and 40) is provided with a stiff, channel-shaped extremity 161 rigidly attached thereto and functioning in all respects as the tip of finger 131. The latter is provided with a checking member 161, in this instance projecting slightly beyond the extremity of the finger and adapted to arrest advance of the finger until after correlation of adjustment has been effected. The checking member 162 is here shown pivoted to a stud block 163 projecting through a slot 164 in the finger and longitudinally slidable relative thereto. A weak spring 165 which lies between the extremity of the channel of the finger and the rear face of the block 163, exerts a forward resilient pressure on checking member 162. The rear extremity of member 162 is channel-shaped and its pivot is so arranged relative to block 163 that its oscillation thereon cannot exceed that illustrated in Figs. 39 and 40.

The checking member is normally held in its advanced position, i. e., projecting very slightly beyond extremity 161 (see Fig. 40) by a catch 166 which projects through a slot 167 in extremity 161 and engages shoulder 168 (at the rear end of the slot) to assume the forward thrust of finger 131. Catch 166 is resiliently held in elevated position by flat spring 169 mounted at 171 to the checking member of 162 and carries a projection 172 by which it may be depressed to clear shoulder 168 and to release extremity 161 and permit the finger to advance independently of the checking member 162.

As illustrated in Fig. 39, the checking member 162 functions to prevent the advance of extremity 161 into engagement with the "2" or lower step of cam 87, thereby affording an opportunity for a downward adjustment of finger 131 and its extremity 161 which may (depending upon the extent of adjustment determined by the position of "hundreds" finger 129) carry the extremity 161 past the step riser into alignment with the "1" or higher step of cam 87. During such downward adjustment, checking member 162 advantageously pivots about its point of engagement with cam 87, thereby avoiding any wearing sliding of either member 162 or extremity 161 over the face of a step.

On the other hand, if the downward adjustment of finger 161 be insufficient to carry it out of alignment with the lower (in this case the "2") step, a release of checking member 162 will allow the finger 131 to complete its advance to such lower step.

The controlling mechanism for releasing checking member 162 is here shown in the form of a cam lever 173 pivoted at 174 and controlled by a bell crank lever 175 to which it is connected by link 176. Normally link 176 is held in the elevated position shown in the full lines against the tension spring 177 by a cam 178, rotatable with cams 119 and 121. Cam 178 is so designed and timed with respect to cams 119 and 121 that it releases cam lever 173 only after cam 119 has released lever 117 to effect the aforesaid correlating operation. Thereupon, the bell crank 175 clears the offset 179 on the cam, allowing cam lever 173 to be pulled down to the fixed lower position shown in dotted lines in Fig. 38. Such lower position is fixed and predetermined by the circular portion 181 of cam 178, in which position the cam lever 173 is held until after the completion of the recording operation. Thereupon, it is again elevated to inoperative position by the continued rotation of cam 178. Whether the cam lever 173, in its lowered position, engages and releases catch 166 depends upon the degree of downward adjustment of finger 131 (as determined by the position of "hundreds" finger 129). If it receives a minor downward adjustment (such as would ensue from a "0", "1", "2", "3", etc., setting of "hundreds" finger 129) cam lever 173 will depress and release catch 166, allowing finger 161 to advance into engagement with the next lower step as required by the position of the "hundreds" finger. On the other hand, if "thousands" finger 131 and its extremity 161 receive a major depression (resulting from proximity of the "hundreds" finger to a "9" position), it will have been carried by a safe margin into alignment with the higher step and need not be released. Lever 173 need not, therefore, (and does not in the present case) drop far enough to release catch 166. When finger 131 receives the full resilient thrust of the operating mechanism of the adding machine mechanism (which occurs at the end of the stroke) flat spring 169 will buckle slightly (but only slightly) and allow extremity 161 actually to contact with the step cam, thereby insuring proper alignment of the "thousands" digit in the adding machine, slot 167 being elongated sufficiently for this purpose. (Figs. 39 and 40.)

Similar auxiliary mechanism is also advantageous for the "ten thousands" finger 132, and devices similar to those shown in Figs. 39 and 40 are provided therefor (see Fig. 17). Simultaneous operation of the cam levers 173 for both "thousands" and "ten thousands" fingers is possible whether the "thousands" and "ten thousands" fingers have similar adjustment (as in the present instance) or independent correlation as in apparatus of larger capacity. Operating link 176 is here shown connected to a short shaft 182, extending between cam levers 173 for the "thousands" and "ten thousands" fingers (see Fig. 17).

Figure 41:
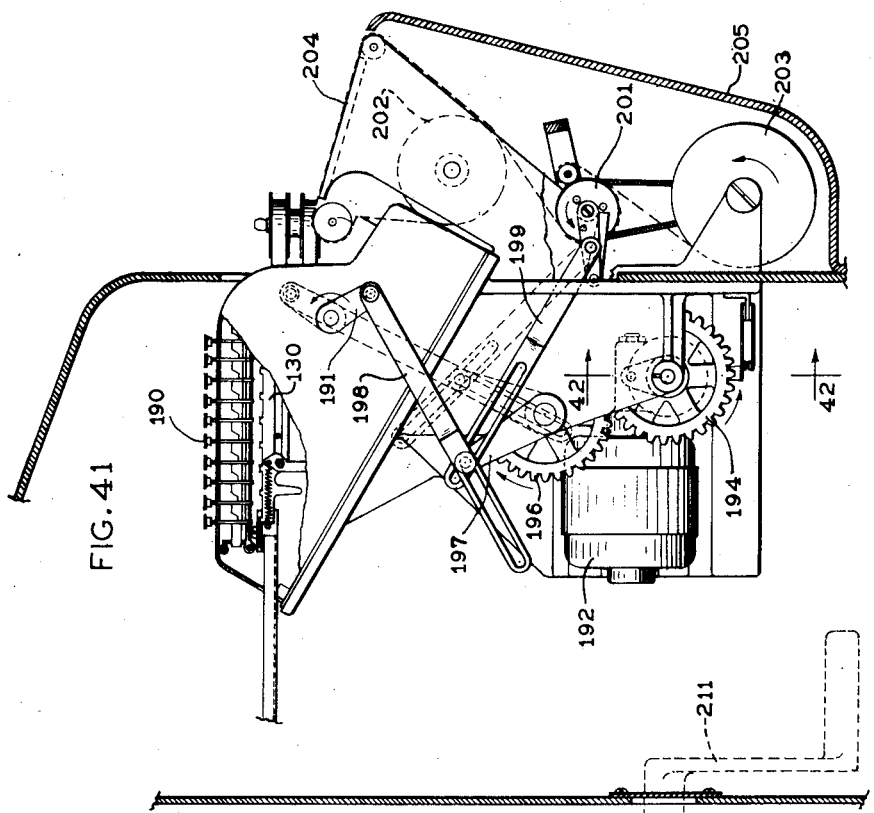
Fig. 41 is a side elevation on a larger scale than that shown in Fig. 4, of the recorder and its operating mechanism.
Figure 42:
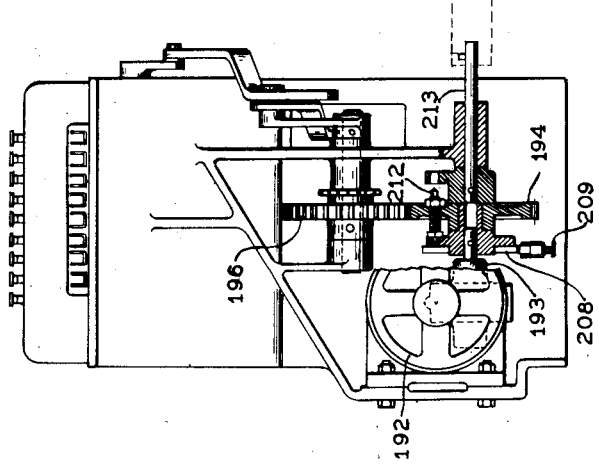
Fig. 42 is a rear elevation, partly in section, on plane 42—42 of Fig. 41.

The adding machine digit slides with the step cam engaging members 102, 103, etc., are advanced into engagement with the step cams by oscillation of the adding machine lever 191 operating the sector shaft in the adding machine (Figs. 4, 41 and 42). This is a conventional adding machine operation which takes place in ordinary functioning of the adding machine after the keys have been depressed. In the present instance, however, the digit slides are set not by the adding machine keys 190 but by engagement of the fingers with the respective step cams. In conventional adding machines of the type here employed, the respective digit slides are given maximum travel by the operating lever 191 if no key be depressed, in which event they advance until their movement is arrested by engagement with a step cam. The keys ordinarily remain idle, and indeed may, if desired, be omitted or removed.

Another characteristic of an adding machine of this design is that improper adjustment of the fingers may result in faulty alignment of the type, e. g. 14075 or 14075 instead of 14075. The difficulty is aggravated in the case of the "0" digit, since it is displaced with the smallest movement of the fingers. There is, therefore, a relatively small clearance between the finger and the step cam. To gain full advantage of what clearance is available, the "zero" step on "hundreds" finger 129 is therefore placed in the middle of the extremity 133 as illustrated (Figs. 23, 36 and 37).

While the adding machine may be operated by hand, it is convenient to employ a motor 192 which through reduction gearing 193, rotates meshed gears 194 and 196. The latter gear carries a crank 197 which oscillates connecting rods 198 and 199 each having a slotted connection therewith to provide the lost motion necessary for limiting the stroke and delaying the return stroke. Rod 198 oscillates the adding machine crank to effect the conventional operations of advancing and retracting the fingers, printing, and totalizing. Rod 199 operates tape advancing or feeding mechanism 201 which serves to unwind the record tape from roll 202 and wind it upon roll 203.

Any appropriate tape feeding and winding mechanism may be employed and the details of the particular mechanism employed here are not important in this connection. It should be noted that the record tape after issuing from the adding machine with the printed record thereon passes across an inclined table 204 which serves not only to expose the record immediately after printing but presents it conveniently for addition of legends or notations thereto. Obviously the record may be printed in duplicate or triplicate if desired, either upon tapes, cards or other record sheets.

The tape or record feeding mechanism is advantageously enclosed in a removable housing 205 outside the sealed housing 72 which encloses the balance of the apparatus including the adding machine itself. The record tape may, therefore, be removed and replaced simply by removing the cover 205 without allowing access to the recorder or other mechanism which may therefore be made tamper proof.

In this instance, cam 119 (Figs. 4 and 29) is rotated by motor 192 through a chain 206 driven from a sprocket on the shaft of gear 196. The chain sprockets are preferably of equal size so that cam 119 is rotated one revolution for each cycle of operations of the recording mechanism. It is synchronized with the operation of the recording mechanism so that the step cams will be locked against movement prior to the advance of the fingers into engagement therewith. Upon retraction of the fingers, the cam will have rotated far enough to release the step cams and dial shaft.

Operation of the recording mechanism may be controlled in any appropriate manner to take place after the scale has come to balance. For example, a circuit may be closed upon the placing of a load on the scale to energize a time relay or timing mechanism which after the lapse of a few seconds while the scale is coming to balance, operates the recording and associated mechanism. In the present instance, control is effected manually by momentarily closing push button switch 207. This energizes the motor and starts the operation. Almost immediately the switch cam 208 on the same shaft with gear 194 allows switch contacts 209 to close, thus completing a circuit parallel with that of push button 207 and maintaining the motor in operation even though push button 207 has been released and its circuit broken. When the motor has completed one cycle of operations, i. e., when gear 194 has made one revolution, the cam 208 opens the switch contacts 209, breaking the circuit and stopping the motor.

In the arrangement shown, it has been found that the delay involved in starting the motor and rotating cam 121 to a position where it actuates the clamping device (see Figs. 21 and 29) allows adequate time for the scale to come to balance even though push button 207 be pressed immediately upon the placing of a load upon the scale.

To avoid interruption of operations as a result of failure of current supply, a hand crank 211 may be employed to operate the recording mechanism. In that event the motor is disconnected from gear 194 by shifting the clutch device 212 into operative connection with the crank handle shaft 213.

To print only the net weight of a load, the apparatus is provided with a tare poise 214 (Figs. 4 and 30) in this instance slidable on an auxiliary bar 216 connected to beam 12. Since the poise 214 is offset laterally from the axis of the beam 12, it is counterbalanced laterally by a weight 217 on the opposite side of beam 12. The poise is shifted along bar 216 by a slidable rack rod 218 connected to the poise by link 219 and guided by a slotted tube 221. The pinion 222 (Figs. 30 and 31) which operates the rack through a slot in the tube is driven by an operating handle 223 (Fig. 2) on the front of the machine through appropriate mechanism comprising tubular shaft 224 and shaft 226 connected by helical gears 227. At its lower end shaft 226 carries a gear 228 which drives pinion 222 through a small pinion 229 in order to move the tare poise through its complete range within one revolution of handle 223.

In practice the run of the tare poise need not cover the entire range of tare weight which might be encountered. A poise is selected of such weight as will adjust the apparatus to the range of tare weights encountered in a given situation. As presently pointed out, the dead load poise may also be employed to offset minimum tare weight in a given range.

After the tare poise has been set, it may be locked in position by rotating thumbscrew 231 (Fig. 2) which is threaded into fixed rod on shaft 232 until the former bears tightly against the end of tubular shaft 234. After the poise has been set, the handle 223 is turned back slightly to relieve any tension on link 219 (Fig. 33) and thereby to avoid any interference with the operation of beam 12.

Associated with the tare poise handle is a rotary dial 237 carrying graduations 238 thereon representing tare weights and which rotates with the handle 223, being connected to hollow shaft 224 (Fig. 2). The actual tare is indicated by stationary pointer 239. To adapt the apparatus to different situations where widely different tare weights are employed, the dial 237 is advantageously provided with a subjacent dial card 241 carrying a series of tare weights 242 in round numbers, as "1000", "2000". If the scale is to be employed in situations where the tare weights vary from three thousand to four thousand pounds, the subjacent dial card is adjusted so that the numeral "3000" appears in a window 243 in dial 237. Card 241 is then fastened against further movement relative to dial 237 and thereafter rotates with it. In the illustration shown in Fig. 2, the minimum tare weight is three thousand pounds and a variation up to four thousand pounds is possible. The total tare weight is therefore three thousand pounds plus the "fractional" tare weight indicated by the pointer 239. In the event the scale is used in railroad yards where very high tare weights prevail, the tare poise mechanism is appropriately adjusted and the card 241 is shifted to indicate the minimum tare weight.

To increase the tare weight the handle 223 should in this instance, be turned in a clockwise direction so that the graduations 238 pass pointer 239 in ascending order. To assist the operator in setting tare poise and reading the tare weight correctly, the opposite half of card 241 is provided with a series of graduations, "500", "1500", "2500", etc., one of which (in this case "3500") appears through an opposite window 245. The operator therefore knows that to increase tare weights he must rotate handle 223 in a clockwise direction so that the weight "3500" will be approached as the dial readings increase.

Since the tare weight frequently changes, it is desirable to record the tare weight of a given load and associate it with the net weight of the load. This is conveniently effected in the present instance by utilizing surplus portions of the adding machine. In this case, the adding machine having nine banks, the last four digit slides of the adding machine are available and are provided with extension fingers 246, 247, 248, and 249. These digit slides, the type sectors, and their associated mechanism are easily disconnected from the totalizing mechanism by severing the totalizer link so that the digits set up in the last four banks by the tare weight are not carried into the totalizing or accumulator mechanism, the latter being used only for net weights.

To transfer to the recording mechanism the setting of the tare weight, shaft 226 is extended upwardly and through spiral gears 251 (Fig. 17) operates a tare step cam 252. The latter comprises in this instance three circular sets of steps 253, 254 and 256, representing respectively the "units", "tens", and "hundreds" digits of the tare weight. Since in this instance the unit tare weight is twenty-five pounds, the "units" cam steps comprise a series of alternate "0" and "5" steps 258 and 259 respectively (Fig. 18) whose height is such as to cause the finger 246 selectively to set the "0" or "5" "units" digits in the adding machine (Fig. 17).

"Tens" step cam 254 comprises ten sets 261 of four steps each, said steps representing "0", "2", "5", and "7". The "hundreds" step cam 256 comprises a single set of ten steps 262 representing the digits from "0" to "9".

Since in this instance any given range of tare weights is such that the highest digit in the weight does not vary, the latter may be set simply by locking down the proper key in the highest bank of the adding machine. If as here shown, the range of tare weights is between 3000 and 3999 pounds, a hold-down device 257 is positioned to hold down the "3" key in the aforesaid bank with the result that "3" is automatically printed with each printing of the tare weight. It should be understood by the use of one or more terminal zeros placed on the tape, the size of tare weights may exceed 10,000 pounds without employing more than four variable digits in the tare weight.

Surreptitious changing of the tare poise by handle 223 is impossible since a printed record is made of the load offset by the tare poise, for record of a net weight.

In order to print a total of the net weights, it is preferable momentarily to release the key held down by device 257 so that its digit will not appear as part of the printed total. Also the step cams should be shifted backward slightly to the "9" position so as not to offer any obstruction to the free advance of the adding machine fingers in the totalizing operation. The aforesaid shifting may be readily effected simply by momentarily moving the dial pointer back slightly from its zero position. In the illustrative apparatus, the ten thousands finger should also be momentarily shifted to clear its step cam since the latter has no "nine" step. The total may be printed by depressing the total printing key on the adding machine and then actuating the adding machine manually or by pressing the button 207.

In normal operation, the type sectors for the tare weight are set simultaneously with the setting of the net weight and will be printed simultaneously with the printing of the net weight. The tare weight will not, however, be totalized with the total of the net weights.

To minimize the weight of the tare poise, the dead load poise 29 may advantageously be used to offset the minimum tare load for which the apparatus is set. In this instance, the dead load poise could be used to offset 3000 pounds tare load (in addition to the dead load) simply by moving it farther along on its beam, and the tare poise 214 (which would be relatively lightened) would serve to offset variations in tare weight between 3000 and 4000 pounds.

Obviously, the invention is not limited to the details of the illustrative apparatus, since these may be variously modified. Moreover, it is not indispensable that all features of the invention be used conjointly, since various features may be used to advantage in different combinations and sub-combinations.

Having described our invention, we claim:

1. Weighing apparatus of the character described comprising in combination a weight exhibiting device including a weight responsive member adapted to be moved to a position representing the weight of the load, an element for transmitting the force of the load to be weighed, said element and said load responsive member being movable in substantially parallel lines, a floating lever provided with curved surfaces at the ends thereof formed on arcs of relatively large radii having a common axis close to the center of gravity of said lever, flexible tapes connecting said lever to said element and to said load responsive device respectively and adapted to wind on and unwind from said respective arcs, said lever being provided with means including a curved surface coaxial with said arcs for causing said lever to roll in a straight line parallel to the line of movement of said load responsive member, said means being substantially closer to the connection of said element than to that of said load responsive member to effect a substantial multiplication of the movement of the latter compared with that of said element, and means connected to said lever for counterbalancing the pull of the load.

2. Weighing apparatus of the character described, the combination comprising a weight responsive member movable to a position representing the net weight of the load, means for offsetting the tare weight of the load, recording mechanism including an adding machine having a total number of columns equal to the sum of the digits in the net and tare weights, devices controlled respectively by said weight responsive member and said tare offsetting means for setting up the net and tare weights respectively in different columns of said adding machine, and means for operating the adding machine to print simultaneously the net and tare weights.

3. Weighing apparatus of the character described comprising in combination a load responsive member movable to a position representing the weight of the load, mechanism for printing the weight of the load and provided with fingers for controlling the printing of the several digits in the weight of the load, said weight responsive member including a device for controlling the setting of the lowest digit in the weight of the load, and mechanism for multiplying the unit increment of movement of said device and provided with means for setting the finger controlling the aforesaid lowest digit in the weight of the load.

4. Weighing apparatus of the character described comprising in combination a weight responsive member movable to a position representing the weight of the load, recording mechanism including a conventional adding machine provided with projecting fingers connected to the digit slides of said machine, said weight responsive member having a plurality of step cams for setting certain digits in the weight of the load, the height of the steps of said cams corresponding to the unit increments of movement of the respective digit slides, said weight responsive member also provided with a device for controlling the setting of the lowest digit in the weight of the load, said device having a plurality of projections each representing a multiple of the unit weight, mechanism for multiplying the increments of movement of said device including a step cam for setting the finger controlling the lowest digit in said adding machine, and means for operating said adding machine to advance said fingers into engagement with the respective step cams to set the respective digits in the weight of the load in said adding machine.

5. Weighing apparatus of the character described comprising in combination a weight responsive member movable to a position representing the weight of the load, recording apparatus for printing the several digits in the weight of the load and having projecting fingers for controlling the setting of the respective digits, said weight responsive member having a plurality of step cams for setting the third and higher variable digits in the weight of the load and having a device for controlling the setting of the first two digits in the weight of the load, said device having a plurality of projections each representing a multiple of the unit weight, and mechanism controlled by said device for multiplying its increments of movement and including a step cam for setting the fingers controlling the first two variable digits in the weight of the load.

6. In weighing apparatus of the character described, a weight responsive member having relatively small increments of movement for each unit of weight, recording mechanism having printing members for printing respectively the several digits in the weight of the load, said weight responsive member having a device for controlling the printing of the lowest digit in the weight of the load and provided with a plurality of projections each representing a multiple of the unit weight, and mechanism controlled by said device for multiplying the increment of movement of said device to effect the setting of the member for printing the lowest digit in the weight of the load.

7. In weighing apparatus of the character described the combination comprising a weight responsive member having a relatively small movement for each unit of weight and provided with a toothed disc, each tooth of which represents a multiple of the unit weight, recording mechanism having members for controlling the setting of the respective digits of the weight of the load, a step cam for setting the members for recording the unit weight in said mechanism and having a range of movement substantially greater than the unit increment of movement of said weight responsive member, and mechanism controlled by said toothed disc for moving said step cam to a position representing the units digits in the weight of the load.

8. Weighing apparatus of the character described comprising in combination weight recording mechanism having a plurality of fingers for controlling the setting of the respective digits in the weight of the load, a weight responsive member movable to a position representing the weight of the load and having a plurality of step cams for controlling the setting of the respective fingers, and means for transversely moving said fingers relative to said step cams to insure the engagement of a finger with the proper step on its cam.

9. Weighing apparatus of the character described comprising in combination weight recording mechanism having a plurality of fingers for controlling the setting of the respective digits in the weight of the load, a weight responsive member movable to a position representing the weight of the load and having a plurality of step cams for controlling the setting of the respective fingers, and means controlled by the "units" cam for moving said fingers transversely to their line of movement to avoid engagement of a finger with an improper step on its cam.

10. Weighing apparatus of the character described comprising in combination a scale, a series of step cams movable to positions representing a load on the scale, weight recording mechanism having a plurality of fingers controlling the setting of the several orders of digits in the weight record and adapted to be set by said step cams, mechanism controlled by the position of a lower digit finger for adjusting the relative position of the next higher finger and its step cam to insure against erroneous setting of the higher digit, and means for retarding full operation of such higher finger until substantial completion of such adjustment.

11. Weighing apparatus of the character described comprising in combination a scale, a series of step cams movable to positions representing a load on the scale, weight recording mechanism having a plurality of fingers controlling the setting of the several orders of digits in the weight record and adapted to be set by said step cams, means for advancing said fingers substantially simultaneously toward said step cams, mechanism controlled by the position of a lower digit finger for adjusting the relative position of the next higher finger and its step cam to insure against erroneous setting of the higher digit, and means for retarding full operation of such higher finger until substantial completion of such adjustment.

12. Weighing apparatus of the character described comprising in combination a scale, a series of step cams movable to positions representing a load on the scale, weight recording mechanism having a plurality of fingers controlling the setting of the several orders of digits in the weight record and adapted to be set by said step cams, mechanism controlled by the position of successive fingers for adjusting the relative position of the next higher finger and its step cam to insure against an erroneous setting of the higher digit, and means for retarding full operation of such higher finger until substantial completion of such adjustment.

13. Weighing apparatus of the character described comprising in combination a scale, a series of step cams movable to positions representing a load on the scale, an adding machine having a plurality of simultaneously advancing digit fingers adapted to engage and be set by the respective step cams, mechanism controlled by the position of a lower digit finger for adjusting the relative position of the next higher finger and its step cam to insure against an erroneous setting of the higher digit, and means for retarding full operation of such higher finger until substantial completion of such adjustment.

14. Weighing apparatus of the character described comprising in combination a weight exhibiting device including a weight responsive member adapted to be moved to a position representing the weight of the load, an element for transmitting the force of the load to be weighed, said element and said load responsive member being movable in substantially parallel lines, a floating lever provided with curved surfaces at the ends thereof formed on arcs of relatively large radii, flexible tapes connecting said lever to said element and to said load responsive device respectively and adapted to wind on and unwind from said respective arcs, said lever being provided with means including a curved surface coaxial with said arcs for causing said lever to roll in a straight line parallel to the line of movement of said load responsive member, said means being substantially closer to the connection of said element than to that of said load responsive member to effect a substantial multiplication of the movement of the latter compared with that of said element, and means connected to said lever for counterbalancing the pull of the load.

15. Weighing apparatus of the character described comprising in combination weight indicating means including a rotary indicator shaft and pinion thereon, a longitudinally reciprocable rack meshing with said pinion for rotating said shaft and mounted for reciprocation in a straight line, a load tension element reciprocable in a line having substantially a fixed angular relation to said line of reciprocation of said rack, a floating lever between said tension element and said rack and having its ends curved respectively on arcs to which said lines of reciprocation are tangent at all positions of oscillation of said lever, flexible tapes connecting said lever with said tension element and said rack respectively, said flexible tapes being adapted to wind on and unwind from said curved ends as said lever oscillates a supporting flexible tape connected to said lever at a point intermediate its ends for supporting said lever, said lever having a winding surface for said supporting connection curved on an arc to which said supporting connection is tangential at all positions of oscillation of said lever, said winding surface being substantially closer to the connection of said tension element than to said rack to effect a substantial multiplication of the movement of said tension element, and load counterbalancing means connected to said lever for counterbalancing the pull of said tension element.

16. Weighing apparatus of the character described comprising in combination weight recording mechanism having a plurality of projecting members for controlling the setting of the respective digits in the weight of the load, a weight responsive member movable to a position representing the weight of the load and having a plurality of step cams for determining the setting of said members, mechanism for advancing said members into contact with the respective step cams, and means for raising or lowering said members relative said step cams to avoid erroneous setting of said members in critical positions of said step cams.

17. Weighing apparatus of the character described, comprising in combination a load responsive member movable to a position representing the weight of the load and carrying three or more step cams, each representing a denominational order in the weight of a load, recording mechanism having a plurality of fingers each controlling a denominational order, said fingers being movable into engagement with the corresponding step cam to be set thereby to record the respective digits in the weight of the load represented by the position of said step cams, means for advancing said fingers into engagement with said step cams, and means for relatively adjusting said fingers and step cams to avoid engagement of an improper step in critical positions of said step cams.

18. Weighing apparatus of the character described, comprising in combination a load responsive mechanism including a shaft carrying a step cam movable to a position representing the weight of a load, recording mechanism having a plurality of fingers, each controlling a denominational order, an auxiliary step cam independent of said weight responsive mechanism for controlling the setting of the finger representing the lowest denominational order, said first-named step cam controlling the setting of a finger representing a higher denominational order, and mechanism controlled by said step cam for moving said auxiliary step cam to a position representing the digit in the lowest denominational order in the weight of the load.

19. Weighing apparatus of the character described comprising in combination a load responsive member including a step cam movable by the load to a position representing the weight of the load, weight recording mechanism including a plurality of fingers, each controlling a variable denominational order in the weight of a load, said step cam controlling the positioning of a finger of a higher denominational order, an auxiliary step cam having a series of steps representing only a decimal fraction of the capacity of said step cam, said auxiliary step cam controlling the setting of the finger representing the lowest variable denominational order, and mechanism controlled by the position of said step cam for moving said auxiliary step cam to a position representing the digit in said lowest order.

20. Weighing apparatus of the character described, comprising in combination a load responsive member movable to a position representing the weight of the load and carrying a plurality of step cams, each representing a denominational order in the weight of a load, recording mechanism having a plurality of fingers, each controlling a denominational order, said fingers being movable into engagement with the corresponding step cam to be set thereby to record the respective digits in the weight of the load represented by the position of said step cams, means for advancing said fingers simultaneously into engagement with said step cams, and means for relatively adjusting a finger and its step cam before the advance of any of said fingers to prevent engagement of said finger with an improper step on said step cam in critical positions of said step cam.

21. Weighing apparatus of the character described, comprising in combination a load responsive member including a step cam movable by the load to a position representing the weight of the load, a recording adding machine having a plurality of digit slides with predetermined increments of movement for controlling the digits in each denominational order, an auxiliary step cam having a series of steps representing only a decimal fraction of the capacity of said step cam, said step cams representing successive lower denominational orders in the weight of the load, extension fingers connected to the digit slides representing the denominational orders corresponding to said step cams and adapted to engage said step cams to set said digit slides, the steps on each of said step cams being of the same height as the said predetermined increments of said digit slides, and means for advancing the fingers carried by said digit slides into engagement with the respective step cams.

22. Weighing apparatus of the character described, comprising in combination a load responsive member including a step cam movable by the load to a position representing the weight of the load, a recording adding machine having a plurality of digit slides with predetermined increments of movement for controlling the digits in each denominational order, an auxiliary step cam having a series of steps representing only a decimal fraction of the capacity of said step cam, said step cams representing successive lower denominational orders in the weight of the load, mechanism controlled by the position of said step cam for setting said auxiliary step cam, extension fingers connected to the digit slides representing the denominational orders corresponding to said step cams and adapted to engage said step cams to set said digit slides, the steps on each of said step cams being of the same height as the said predetermined increments of said digit slides, and means for advancing the fingers carried by said digit slides into engagement with the respective step cams.

23. Weighing apparatus of the character described, comprising in combination a weight responsive member movable to a position representing the weight of the load, a recording adding machine having a plurality of digit slides with predetermined unit increments of movement for controlling the digits in the respective denominational orders of said machine, a plurality of said slides representing successive lower denominational orders being provided with projecting fingers, said weight responsive member having a plurality of step cams corresponding to the aforesaid denominational orders and whose respective positions represent the digits in the weight of a load, the risers of the steps of said cams corresponding to the unit increments of movement of the respective digit slides, and means for operating said adding machine to cause said fingers and digit slides to advance into engagement with the respective step cams and for causing said machine to print the digits thus set in the adding machine.

24. Weighing apparatus of the character described, comprising in combination a weight responsive member movable to a position representing the weight of the load, an adding machine having a plurality of digit slides with predetermined unit increments of movement for controlling the digits in the respective denominational orders of said machine, a plurality of said slides representing successive lower denominational orders being provided with projecting fingers, said weight responsive member having a plurality of step cams corresponding to the aforesaid denominational orders and whose respective positions represent the digits in the weight of a load, controlling the higher denominational orders in the weight of a load, an auxiliary step cam controlling the lowest denominational order in said weight, and having a series of steps representing only a fraction of the capacity of said load responsive member, mechanism controlled by a higher order step cam for controlling the position of said auxiliary step cam, the steps on each of said step cams being of the same height as the said predetermined increments of said digit slides, and means for advancing the fingers carried by said digit slides into engagement with the respective step cams.

25. In weighing apparatus, the combination comprising a load counterbalancing element carrying a rack, a rocker for transmitting pull of the load to said rack, said rocker having an extremity which is curved to be tangential with the line of travel of said rack, flexible tapes winding and unwinding from said curved surface and connected to said rocker and said rack, a pinion meshing with said rack and guiding surfaces at the pitch line of said rack and said pinion to maintain a constant ratio of movement between said rocker and said pinion.

26. Weighing apparatus designed for a wide range of scale multiples comprising in combination load counterbalancing mechanism having a predetermined range of counterbalancing forces and including weight exhibiting means adapted to move proportionally to the weight of the load in counterbalancing the latter, a steelyard rod for transmitting the pull of the load from the lever system of the scale platform, and an intermediate lever having a fixed fulcrum for changing the ratio of pull of the steelyard rod transmitted to said load counterbalancing mechanism, said steelyard rod and load counterbalancing mechanism being connected to said lever on the same side of the fixed fulcrum, said lever having a movable fulcrum adapted to be shifted to adjust the range of tension of the steelyard rod as determined by the scale lever system to the force range of said counterbalancing mechanism.

27. In weighing apparatus of the character described the combination comprising means for offsetting the tare weight of a load, a weight responsive member movable by the weight of the net load to a position representing the net weight of the load, devices for adjusting the tare offsetting means, a recording device, mechanism controlled by said adjusting devices for setting said recording device to record the tare weight, and recording means controlled by said weight responsive member for recording said net weight.

28. In weighing apparatus of the character described the combination comprising a tare beam having a poise for offsetting the tare weight of a load, a separate weight responsive member movable by the load to a position representing the net weight of the load, means for shifting said poise, devices for exhibiting the tare weight, mechanism operated by said shifting means for setting said weight exhibiting devices to exhibit the tare weight of the load, and other mechanism controlled by said weight responsive member for exhibiting the net weight of the load.

29. In weighing apparatus of the character described, the combination comprising a dead load beam having a dead load poise for offsetting the dead load and the minimum tare weight of the live load, a movable tare poise for offsetting tare weight in excess of the minimum tare, a separate weight responsive member for exhibiting the net weight of the load, means for shifting said tare poise, and recording mechanism controlled by said shifting means for recording the tare weight.

30. Weighing apparatus of the character described, the combination comprising means for offsetting the tare weight of the load, a weight responsive member movable to a position representing the net weight of the load, recording mechanism for recording the net and tare weights of the load, and devices controlled by said weight responsive member and tare weight offsetting means for setting said recording mechanism to record simultaneously the net and tare weights.

31. Weighing apparatus of the character described, the combination comprising means for offsetting the tare weight of the load, a weight responsive member movable to a position representing the net weight of the load, recording mechanism for recording the net and tare weights of the load, and mechanism for separately recording in a single cycle of operations both said net and tare weights.

32. Weighing apparatus of the character described, the combination comprising means for offsetting the tare weight of the load, a separate weight responsive member controlled by the net load and movable to a position representing the net weight of the load, mechanism for recording the net weight of the load on the scale, and means controlled by said tare offsetting means for recording the tare weight.

OLIN H. BASQUIN.
OTTO P. HAEGELE.